United States Patent
Van Cauter et al.

(10) Patent No.: US 12,523,577 B2
(45) Date of Patent: Jan. 13, 2026

(54) SAMPLER DEVICE FOR PARTICLE CONCENTRATION SENSOR

(71) Applicant: PRODRIVE TECHNOLOGIES INNOVATION SERVICES B.V., Son en Breugel (NL)

(72) Inventors: Ralph Pernell Van Cauter, Son (NL); Djarek Hendrikus Josephus Maria Van Den Hoogen, Son (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 943 days.

(21) Appl. No.: 17/636,156

(22) PCT Filed: Aug. 21, 2020

(86) PCT No.: PCT/EP2020/073468
§ 371 (c)(1),
(2) Date: Feb. 17, 2022

(87) PCT Pub. No.: WO2021/032875
PCT Pub. Date: Feb. 25, 2021

(65) Prior Publication Data
US 2022/0291091 A1    Sep. 15, 2022

(30) Foreign Application Priority Data
Aug. 21, 2019 (NL) ...................... 2023680

(51) Int. Cl.
*G01N 1/22* (2006.01)
(52) U.S. Cl.
CPC ......... *G01N 1/2247* (2013.01); *G01N 1/2273* (2013.01)

(58) Field of Classification Search
CPC ........................ G01N 1/2247; G01N 1/2273
(Continued)

(56) References Cited

U.S. PATENT DOCUMENTS

| | | |
|---|---|---|
| 1,874,549 A | 8/1932 | Krueger et al. |
| 4,115,229 A | 9/1978 | Capone |

FOREIGN PATENT DOCUMENTS

| | | |
|---|---|---|
| DE | 3908699 A1 | 9/1990 |
| DE | 202015008643 U1 | 3/2016 |

(Continued)

OTHER PUBLICATIONS

Folmer, Gerrit, English Machine Translatin of NL 2011993 C1, obtained from Google Patents on Feb. 6, 2025, original NL document pubically avaiable on Jun. 22, 2015. (Year: 2015).*

(Continued)

*Primary Examiner* — Christine T Mui
(74) *Attorney, Agent, or Firm* — Kolitch Romano Dascenzo Gates LLC

(57) ABSTRACT

A sampler device for sampling gas for a particle concentration sensor from a flow, includes a first chamber having a first inlet and a first outlet and defining a main flow direction of a gas stream between the first inlet and the first outlet. A second inlet and a second outlet are configured to provide a sink and a source of a sample gas stream, respectively. The second inlet and the second outlet are provided in the first chamber at a first position and a second position, respectively. The first position and the second position overlap along the main flow direction. The first chamber is configured for providing a laminar flow of the gas stream at the first position and the second position.

20 Claims, 4 Drawing Sheets

(58) Field of Classification Search
USPC .......................................................... 436/52
See application file for complete search history.

(56) References Cited

FOREIGN PATENT DOCUMENTS

| HR | PK20080435 B3 | 6/2011 |
|----|---------------|--------|
| NL | 2011993 C2 | 6/2015 |
| WO | 2017220618 A1 | 12/2017 |

OTHER PUBLICATIONS

International Search Report and Written Opinion of the International Searching Authority from the European Receiving Office in PCT/EP2020/073468 Nov. 16, 2020, which is an international application corresponding to this U.S. application.

* cited by examiner

FIG 3A : I-I

SAMPLER DEVICE FOR PARTICLE CONCENTRATION SENSOR

TECHNICAL FIELD

The present disclosure is related to a sampler device for providing a flow of sample gas, in particular air, to a particle concentration sensor. The present disclosure is also related to a device for sensing particle concentration in a gas, in particular air.

INTRODUCTION

Particulate matter such as fine and ultrafine particles (e.g. particulate matter PM 10 or 2.5) constitute a form of air pollution that may induce adverse health effects on the human body. Particle sensors can be used to measure the concentration of particulate matter and provide information about the air quality. Additionally or alternatively they may also be used as an input for controlling measures that can improve the air quality. For example, a particle sensor can be used in the heating, ventilation and air conditioning (HVAC) system of a car to measure the concentration of hazardous particles in the air flow that is passing through such a system. Based on the information, the system may be configured to reduce the exposure of occupants to air having a low air quality, for instance by controlling the source from which inlet air is sourced or by removing particulate matter from the air stream provided at the inlet.

WO2017220618 A1 describes such a particle sensor that can be used in combination with an HVAC system. The disclosed particle sensor comprises a set of two flow fans arranged to adjust flow rates in the sensor such that the measurements become largely independent of non-stationary environmental conditions. Therefore, such a sensor system is ideally suitable to sense mass concentrations accurately in an environment where the sampled air is not stationary, like in a moving vehicle or in an HVAC system of a vehicle.

The disadvantage of such a sensor is however that it does not allow to control absolute flow speeds. Consequently, it does not allow complete compensation of the non-stationary environmental conditions such as pressure differences, which results in a reduced accuracy of the measurements. Furthermore, fast changing pressure differences caused in HVAC systems for example by opening a window, activating a blower fan or driving at various speeds easily induces a pressure difference in the order of ~1000 Pa, which place a burden on the compensating capabilities of the flow generating components (e.g. fans) used in such a sensor. In order to enable compensation, the flow or pressure difference must be measured and sufficient fan capability must be provided to compensate for this pressure difference, e.g. the static pressure operation point of the fan is orders of magnitude higher than the external disturbance.

SUMMARY

It is an object of the present disclosure to provide a sampler device and a particle sensor comprising such sampler device that can be used for sampling any gas (including any gas composition), in particular air (including polluted air, such as an exhaust gas of a combustion engine), in non-stationary environmental conditions, in particular from a flow of the gas to be sampled, in particular where the flow rate of the gas to be sampled can vary. It is an aim of the present disclosure to provide such devices which have an improved efficiency and accuracy in non-stationary environmental conditions. A reference to air in the remainder of the description may be substituted with any gas, unless it specifically relates to air (e.g. a physical parameter of air).

According to the present disclosure, there is therefore provided a sampler device as set out in the appended claims and a use of such sampler device. According to another aspect, there is provided an assembly or device for sensing particle concentration in air as set out in the appended claims. According to yet another aspect, there is provided a ventilation system as set out in the appended claims. According to yet another aspect, there is provided a vehicle as set out in the appended claims.

A sampler device according to the present disclosure comprises a first chamber through which air from the external environment is made to flow. A second chamber can be fluidly connected to the first chamber. The second chamber can form a sampling chamber and can comprise a particle concentration sensor. The present disclosure provides a solution to providing a sample air stream by appropriately positioning the inlet and the outlet of the sample air duct in an environment where the air flow velocity can vary drastically on short length and time scales, the pressure difference between the inlet and outlet however remaining small and/or substantially stationary, preferably near zero.

To this end, the first chamber comprises a first inlet and a first outlet and defines a main flow direction between the inlet and the outlet. The first chamber is advantageously placed in an air flow, and an air stream is made to enter the first chamber through the first inlet and exit the first chamber through the first outlet. The first chamber further comprises a second inlet and a second outlet configured to provide respectively a sink and a source of a sample air stream for a particle concentration sensor. The sample air stream is sampled from the first chamber, in particular from the air stream passing through the first chamber, wherein the sample air stream forms a flow through the second outlet. The second inlet and the second outlet are provided in the first chamber at a first position and a second position respectively, which (at least partially and preferably completely) overlap along the main flow direction. In other words, the second inlet and the second outlet are located such that a plane perpendicular to the main flow direction crosses both the second inlet and the second outlet. Advantageously, the second inlet and the second outlet fluidly communicate with a second chamber and may form a closed system from second outlet to second inlet for sample air being sampled from the first chamber. A particle concentration sensor can be housed in the second chamber.

Sampler devices according to the present disclosure provide a solution to providing a stable stream of sample air by appropriately positioning the second inlet and the second outlet of the second chamber in an environment where the air flow velocity can vary drastically on short length and time scales. Therefore, the second inlet and the second outlet are arranged at positions that overlap along the main flow direction of the air that is being sampled from the first chamber. The result is that the second inlet and outlet are subjected to substantially the same environmental conditions. Preferably, the first position and the second position within the first chamber are selected such that a pressure in the first chamber at the first and second positions is substantially equal, thereby minimizing the pressure differences across the inlet and the outlet and reducing influences on the flow of the sample air stream, that may be induced by convection means such as air displacement means. For instance, the first chamber is configured to comprise a plane of symmetry parallel to the main flow direction, and wherein the second inlet and the second outlet are arranged at opposite sides of the plane of symmetry. Such second inlet and second outlet may further comprise an inlet duct and an outlet duct, respectively, adjacent the first chamber and in fluid communication with the first chamber. The inlet duct and outlet duct may be configured in mirror symmetry with respect to the plane of symmetry. Additionally or alternatively, the inlet and outlet duct may each define a longitudinal axis substantially perpendicular to the main flow direction.

The sampler device may comprise a second chamber fluidly coupled to the second inlet and to the second outlet, and convection means such as an air displacement means configured to create an air stream from the second outlet to the second inlet through the second chamber. A surprising benefit of a sampler device according to the present disclosure is that it enables the use of low power flow generating components as convection means such as flow fans, heating means or even ionic motors to maintain the sample air stream from the second outlet to the second inlet. Furthermore, it does not depend on an active system controlling the flow generating components and is therefore robust and does not require additional components like pressure sensors and controllers to compensate or regulate the flow for instance to keep it stable. Preferably, the sampler device comprises a second chamber fluidly coupled to the second inlet and to the second outlet, and air displacement means configured to create an air stream from the second outlet to the second inlet through the second chamber.

Preferably, the first chamber of the sampler device is configured for providing a laminar flow of the air stream at the first position and the second position. Providing such a laminar flow has the benefit that it allows for creating a more stable air pressure difference, preferably substantially zero, between the second inlet and the second outlet.

A laminar air flow is determined by the flow velocity for a given channel size and geometry and is only to a small extent dependent on air pressure/temperature via the gas viscosity v. For certain applications in HVAC systems of a vehicle the range of pressure and temperature relevant for the gas viscosity may be expected to be between 0.8 and 1.2 bar and between −40 and 70 degrees Celsius, respectively. For designing a sampler device, one may choose to evaluate the flow regime using the gas viscosity at standard pressure and temperature conditions (101.325 kPa; 0° C.). The occurrence of a laminar flow regime for a 'fully developed' flow through a duct is usually indicated by the Reynolds number when:

$$Re = \frac{v_1 L}{v} = \frac{QL}{Av} < 2300.$$

In the above equation, the following variables are used: flow velocity $v_1$ (m/s), flow rate Q (m³/s), characteristic length L (m), duct area A (m²) and kinematic viscosity v(m²/s). The (mean) flow velocity of air through the first chamber is governed by the flow rate through the chamber in combination with the (cross sectional) area ($v_1$=Q/A) of the chamber. The cross sectional area of the first chamber is advantageously evaluated for a section perpendicular to the main flow direction at the position of the second inlet and second outlet. The characteristic length L represents a typical dimension in a fluid flow. In case of a circular shaped tube, the diameter of the tube is defined as the characteristic length. In case of non-circular cross sectional shapes of the first chamber, a hydraulic diameter $D_H$ is advantageously used as diameter, i.e.

$$D_H = \frac{4A}{P},$$

with A cross sectional area (duct area as defined above) and P the wetted perimeter.

Preferably the first chamber has a geometry configured for providing the laminar flow of the air stream at the first position and the second position. For instance, the first chamber has a characteristic length and a duct area configured for providing the laminar flow at a predetermined flow rate or a range of predetermined flow rates of the air stream through the first chamber for instance between about 0.3 an 10 lpm, for instance between about 0.5 and 8 lpm, for instance about 3 lpm. Preferably, the first chamber has a characteristic length and a duct area configured for providing the laminar flow for mean flow velocities through the first chamber ranging for instance between about 0.02 to 20 m/s, for instance between 1 and 10 m/s. Preferably, the Reynolds number for the air stream is 1500 or less at the first position and the second position, preferably wherein the Reynolds number is 1000 or less, preferably 750 or less. Preferably, the duct area of the first area lies essentially between 7 and 315 mm², for instance between 10 and 50 mm².

The effect of flow distortions in the first chamber on the pressure difference between the second inlet and the second outlet can be reduced by configuring the sampler to provide a larger flow rate through the first chamber than through the second inlet or the second outlet. Preferably, the predetermined flow rate of the air stream is at least 2 times larger than a flow rate of the sample air stream, preferably at least 5 times larger, preferably at least 10 times larger.

The second inlet and/or the second outlet may be provided in a wall of the first chamber. This can have the advantage that the second inlet and/or the second outlet do not disturb the air stream in the first chamber, in particular the air stream at the first and second position, respectively. Beneficially, the second inlet and/or the second outlet are provided in the wall of the first chamber and are configured for maintaining a laminar flow.

Advantageously, the dimensions and locations of the second inlet and second outlet of the sampler device are arranged such that there is no re-sampling of particle laden air drawn from the first chamber and/or that no large foreign objects can enter the second outlet and/or the second inlet.

In an advantageous embodiment, the first chamber is configured for preventing the sample air stream or a part thereof flowing out of the second inlet into the first chamber from entering the second outlet, for instance for essentially preventing particles (e.g. PM 2.5 or PM 10) comprised in the sample air stream flowing out of the second inlet into the first chamber from entering the second outlet. For instance, the second inlet and the second outlet are configured to have a geometry, size and location in the first chamber that prevents such re-sampling at the predetermined flow rates or flow velocities. Suitable geometries, sizes and locations may be determined using techniques, such as particle and flow finite element method simulations, known to the person skilled in the art. Additionally or alternatively, a (physical) barrier (e.g. baffle) may be arranged between the second inlet and second outlet. While the placement of the second inlet and outlet as defined above will generally avoid re-sampling, placing the second inlet and second outlet close to each other may in some designs introduce the possibility of re-sampling, where (a part of) the particle-laden air flow that is exhausted from the second inlet may re-enter through the second outlet. This re-sampling can advantageously be prevented by providing a (physical) barrier in the first chamber, such as a baffle in between the second inlet and second outlet, where an external air flow ensures that the dust-laden air flow exiting the second inlet is removed in a direction away from the second outlet. Preferably, such baffle extends parallel to the plane of symmetry of the first chamber, even more preferably such baffle defines a plane of symmetry coinciding with the plane of symmetry of the first chamber. Additionally or alternatively, such baffle may extend between opposing walls of the first chamber, thereby creating separate conduits in the first chamber along the main flow direction, one of which conduits comprising the second outlet and another one of the conduits comprising the second inlet.

Advantageously, large foreign bodies (e.g. crumbled leaves, bugs, large pollen) are prevented from entering the second outlet and/or second inlet for instance when switching off the sampler device. Therefore, it is preferred that the second inlet and/or second outlet define an inlet flow direction through the second inlet and/or an outlet flow direction through the second outlet, respectively, wherein the inlet flow direction has a directional component corresponding to gravity (G) and/or the outlet flow direction has a directional component opposite to gravity (G). This may be achieved by arranging the second inlet and/or second outlet in a top wall of the first chamber, the top wall being defined as a wall in which gravity acts in a direction from the top wall towards the interior of the first chamber. These large foreign bodies could potentially block or limit the flow of air in certain parts of a particle concentration sensor, limiting sensor reliability and lifetime. Embodiments wherein the second outlet is provided in the top wall of the first chamber, have the additional advantage that the risk of polluting or damaging the sensor is reduced.

Advantageously, it will be convenient to note that the present disclosure allows for cascading chambers of sample air. By way of example, one or more additional chambers can be provided upstream of the first chamber in a cascaded arrangement. Advantageously, each downstream chamber in the cascade can be connected to an upstream chamber in the same way as the second chamber is connected to the first chamber, e.g. with a respective second inlet and second outlet arranged at overlapping positions along a main flow direction of the upstream chamber, and so forth. The particle concentration sensor is provided in the second chamber advantageously being a last chamber of the cascade, or any subsequently cascaded chamber, advantageously the most downstream chamber of the cascade. Such a cascaded arrangement enhances the total effect of flow stability, for instance by reducing the influence of external pressure fluctuations on the flow rate between the first and second chamber. This allows even the use of an ion motor (with only a few Pa of pressure head) to cope with external pressure variations that normally can be handled only by a pump.

Such a sampler device may comprise a nozzle upstream of the first chamber, for instance configured as a part of a conduit for a flow of an HVAC system. The nozzle comprising a third inlet and a third outlet and defining a second main flow direction between the third inlet and the third outlet of a gas stream upstream from the stream in the first chamber. The nozzle further comprises a fourth outlet in fluid communication with the first inlet, e.g. through a first duct connecting the fourth outlet to the first inlet and a fourth inlet in fluid communication with the first outlet, e.g. through a second duct connecting the fourth inlet to the first outlet. The fourth inlet and the fourth outlet are provided in the third chamber at a third position and a fourth position respectively, wherein the third position and the fourth position overlap along the second main flow direction. Such nozzle is configured for flow rates larger than the flow rate through the first chamber, for instance for flow rates between about 10 and 100 lpm.

The present disclosure also relates to a device for sensing particle concentration in a gas, preferably air. Such device for sensing particle concentration comprises a sampler device according to the present disclosure and a particle concentration sensor in fluid communication with the first inlet and the first outlet, in particular in fluid communication with the first inlet and the first outlet via the second inlet and the second outlet such that the particle concentration sensor senses a particle concentration in the sample gas stream, preferably wherein the sensed particle concentration is representative of the particle concentration in the gas stream between the first inlet and the first outlet.

The present disclosure further relates to an assembly for sensing particle concentration in a gas. Such an assembly may comprise two devices for sensing particle concentration in a gas, preferably air, wherein each one of the two devices is configured for sampling gas from a different environment, preferably one of the two devices for sampling inside air and the other one of the two devices for sampling outside air. The benefit is that such an assembly may provide information simultaneously regarding a particle concentration in each of the two environments, which information may be used for selecting a source for ventilating a room or a compartment or a cabin for instance housing people or a driver or passengers. As an example, the source comprising the least amount of particles, that may be detrimental to the health, may be selected as a source for the ventilation.

The present disclosure further relates to a ventilation system for air (e.g. of a vehicle) comprising a sampler device, a device for sensing particle concentration or an assembly according to the present disclosure.

The present disclosure further also relates to a vehicle comprising a sampler device, a device for sensing particle concentration, an assembly or a ventilation system according to the present disclosure.

A use of the sampler device, the device for sensing particle concentration or the assembly according to the present disclosure for sampling gas (air) is described herein. The sampler device is used under conditions in which a laminar flow is provided in the first chamber, for instance a flow rate of the gas through the first chamber is between about 0.3 an 10 lpm, for instance between about 0.5 and 8 lpm, for instance about 3 lpm. Preferably, the sampler device is used under conditions providing the laminar flow, for instance for mean flow velocities through the first chamber ranging between about 0.02 to 20 m/s or between 1 and 10 m/s. Preferably, the sampler device is used under condition wherein the Reynolds number for the air stream is 1500 or less at the first position and the second position, preferably wherein the Reynolds number is 1000 or less, preferably 750 or less.

BRIEF DESCRIPTION OF THE DRAWINGS

Aspects of the disclosure will now be described in more detail with reference to the appended drawings, wherein same reference numerals illustrate same features and wherein:

FIG. 3A represents the top half of FIG. 2 turned upside down.

DESCRIPTION OF EMBODIMENTS

Figure 1:
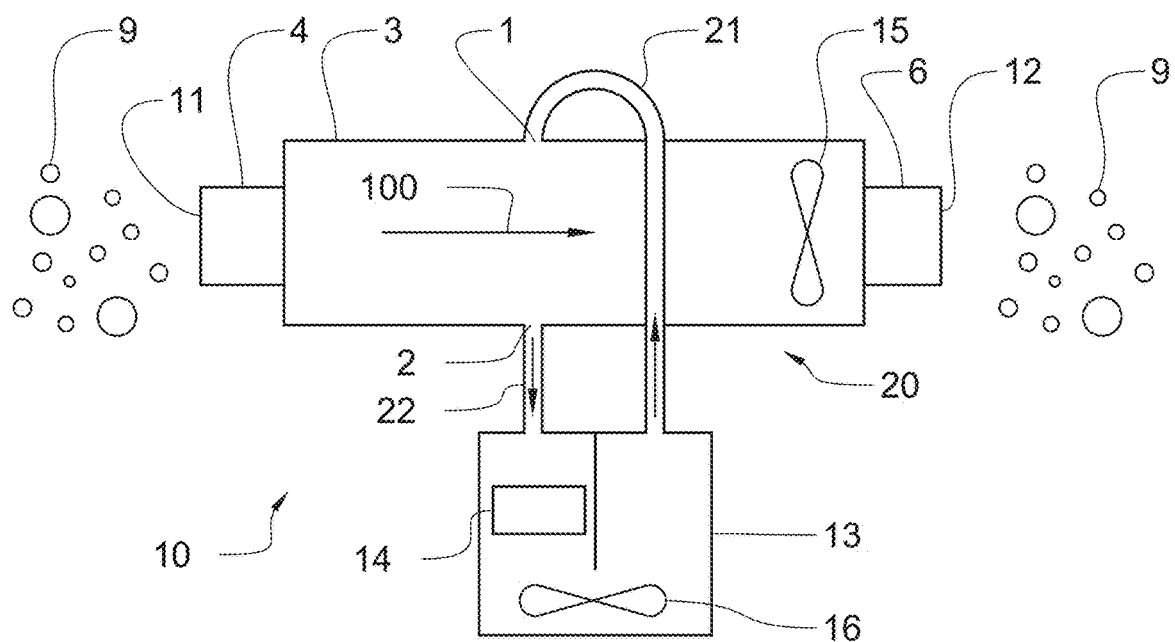
FIG. 1 represents a schematic view of an air sampler device according to the present disclosure assembled in a particle concentration sensor.

Referring to FIG. 1, a device 10 for sensing particle concentration in air comprises a sensor chamber 13, an inlet 11 and an outlet 12 both fluidly communicating with the sensor chamber 13. A particle concentration sensor 14 is housed in the sensor chamber 13 in order to measure a particle concentration in the flow passing between inlet 11 and outlet 12. An air flow 9 comprising particles enters device 10 through the inlet 11, passes through an air sampler 20 and is discharged through the outlet 12. The air flow can be generated or sustained in any suitable way, such as by means of a blower or fan 15 which may or may not be arranged between the inlet 11 and the outlet 12. The air flow can be externally induced, for instance by placing the air sampler 20 in a flow, for instance induced by a fan of an HVAC system. Alternatively, the device can be placed in the environment and natural forces, such as the wind is exploited to create an air flow through the air sampler 20, or the device can be made to move through the environment.

Any suitable kind of sensor can be used as particle concentration sensor 14 in devices of the present disclosure. Advantageously, optical sensors are used, able to measure a particle concentration, e.g. through diffraction of a light beam, such as a laser beam, that is aimed at the air flow. Alternatively, electrostatic particle sensors can be used.

The air sampler 20 according to the present disclosure comprises a first chamber 3 fluidly coupled between the inlet 11 and the outlet 12. The first chamber fluidly communicates with the sensor chamber 13 through an inlet 1 and an outlet 2. Outlet duct 22 connects the outlet 2 with the sensor chamber 13 and provides sample air to the sensor chamber. Inlet duct 21 connects the inlet 1 with the sensor chamber and is configured to remove sample air that has passed the sensor chamber 13.

Figure 2:
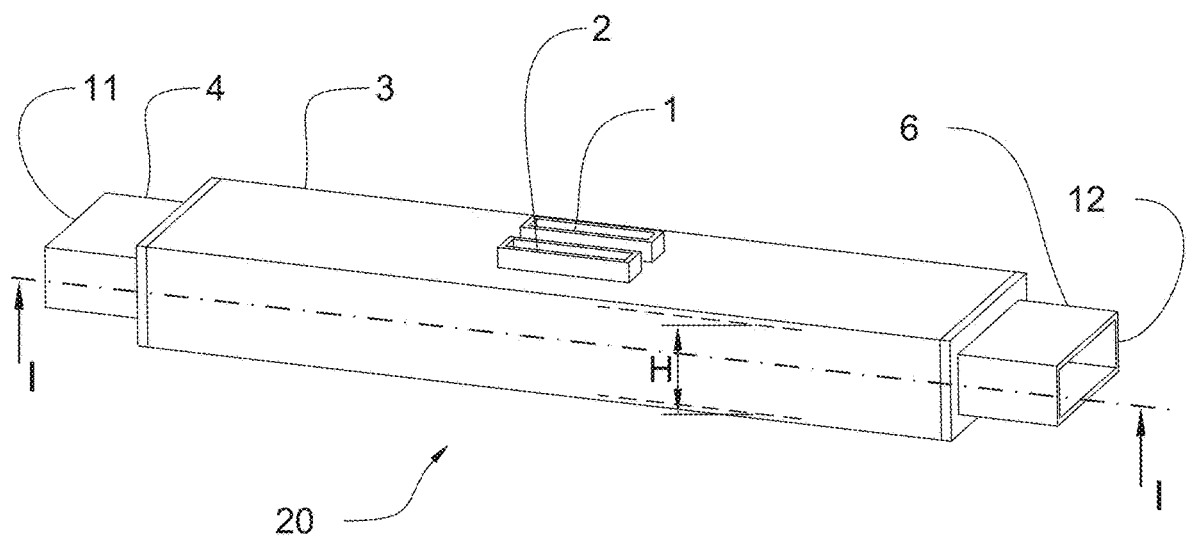
FIG. 2 represents a perspective view of the first chamber of an air sampler device according to the present disclosure.

Referring to FIGS. 1 and 2, the first chamber 3 comprises at one end an inlet duct 4 which can be fluidly coupled to the inlet 11 of device 10. The first chamber 3 also comprises an outlet duct 6 advantageously arranged at the opposite end of the first chamber. Outlet duct 6 can be fluidly coupled to the outlet 12. Inlet 1 and outlet 2 are configured to provide a flow of sample air, sampled from the first chamber 3 to the sensor chamber 13 where it can be sensed by particle concentration sensor 14, and back to the first chamber 3.

Particle laden air is made to flow from the inlet duct 4, through the first chamber 3 to the outlet duct 6, along a main flow direction 100. The inlet 1 and outlet 2 are arranged in the first chamber 3, in the flow path between inlet duct 4 and outlet duct 6. A representative portion of air flowing through the first chamber 3 enters the outlet 2, which reconnects to the inlet 1 after leaving the sensor chamber 13.

According to the present disclosure, the inlet 1 and the outlet 2 are arranged at overlapping positions along the main flow direction 100, as depicted schematically in FIG. 1.

Referring to FIG. 3A, the overlapping positions of inlet 1 and outlet 2 are advantageously arranged next to one another when regarded in a plane perpendicular to the main flow direction 100. At these positions, advantageously, a static and/or dynamic pressure is almost equal, and advantageously no pressure difference exists between inlet 1 and outlet 2. As a result, the flow through the sensor chamber 13, and hence the flow that is seen by the particle concentration sensor 14, is not affected by pressure variations at the inlet 11 or outlet 12, or in the first chamber 3. Advantageously, the flow of sample air from the outlet 2, through sensor chamber 13 to the inlet 1 is maintained by a second fan 16 (see FIG. 1), which can be housed anywhere along the sample air flow path, between outlet 2 and inlet 1, in particular in the sensor chamber 13. Fan 16 can hence operate independently of fan 15.

The geometry of the first chamber 3 is advantageously chosen such that the air flow is smooth/laminar and/or the air flow velocity at the inlet 1 and outlet 2 is equal. This reduces pressure differences between inlet 1 and outlet 2. Furthermore, a laminar flow can reduce the mixing of air flowing out of the inlet 1 into the first chamber 3 with the air flowing from the first chamber 3 into the outlet 2.

Figure 3B:
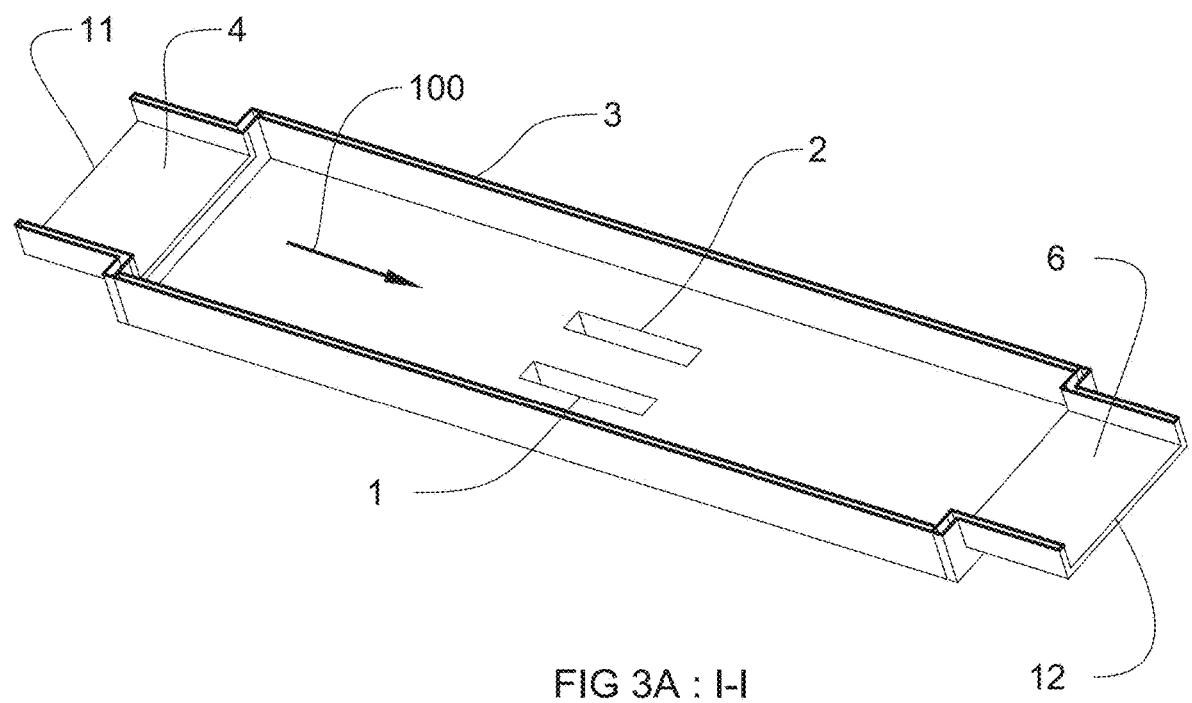
FIG. 3B represents an enlarged portion of FIG. 3A.

In FIG. 3B, possible design parameters at the inlet 1 and outlet 2 are indicated. The apertures of inlet 1 and outlet 2 have respective length $L_1$ and width $W_1$, and are spaced apart by a distance $D_1$. The inlet 1 and outlet 2 are arranged in a wall 301 of the first chamber 3, and interposed between opposing walls 302 and 302'. A distance between each of the inlet 1 and the outlet 2 and the corresponding wall 302, 302' is represented by $W_2$. H represents the chamber height, between wall 301 in which inlet 1 and outlet 2 are arranged and an opposite wall.

The first chamber 3 is advantageously symmetric as depicted by the symmetry axis s, but this is not a necessity. The symmetry axis s is parallel to the main flow direction 100 and advantageously runs halfway between the inlet 1 and the outlet 2. The symmetry axis s advantageously defines a symmetry plane S that comprises the symmetry axis s. The first chamber 3 is advantageously symmetrical with respect to the symmetry plane S, and the inlet 1 and outlet 2 are advantageously located at opposite sides of the symmetry plane S and symmetrical with respect to S. Advantageously, the inlet 1 and outlet 2 are coplanar and the symmetry plane S is perpendicular to the plane defined by inlet 1 and outlet 2, i.e. perpendicular to a plane of the apertures of inlet 1 and outlet 2. It will be convenient to note that the dimensions of the inlet 1 and outlet 2 are advantageously equal, e.g. outlet 2 and inlet 1 have equal $L_1$ and/or equal $W_1$.

The air flow is advantageously laminar at the inlet 1 and outlet 2, and advantageously in the entire first chamber 3.

Advantageously the flow through the first chamber 3 is characterized by $Re \leq 1500$, advantageously $Re \leq 1000$, advantageously $Re \leq 750$, advantageously $Re \leq 500$, and the chamber geometry and flow rate through the first chamber can be selected to achieve the indicated Reynolds number. In determining the Reynolds number, the width W of the first chamber 3 at the location of the inlet 1 and outlet 2 perpendicular to the main flow direction 100 can be considered as the characteristic flow dimension. The kinematic viscosity can be evaluated at standard pressure and temperature conditions (101.325 kPa; 0° C.).

Advantageously, a mean flow velocity through the first chamber 3 is 0.2 (m/s) or less, given that W≈30 (mm), H≈10 (mm) and Q≈3 (lpm—litre per minute). This means that the worst-case Reynolds number (when considering a rectangular cross section and $L=D_H$) for standard temperature and pressure (at STP conditions) equals Re=187, which is well within the range of the laminar flow regime. The flow rate or flow velocity can be selected by appropriate dimensioning of the blower or fan 15.

It will be convenient to note that the outlet 2 can be designed to act as a virtual impactor by appropriate design of the outlet geometry and selection of the flow speeds. This can reduce pollution of the particle sensor as it prevents unwanted particles to enter the measurement chamber.

Although a laminar flow of air is advantageously made to enter the first chamber 3, the side walls 302 and 302' are placed at a distance W2 from the outlet 2 and inlet 1 respectively, such that the effect of wall friction on the laminar flow is negligible at the inlet and outlet. This is because end effects such as wall friction may induce small scale turbulent behavior due to material roughness/imperfections, even in case the air flow can be classified as strictly laminar.

In some circumstances, there can be flow distortions of various kinds causing a non-equal pressure between inlet 1 and outlet 2. The effect of such flow distortions on the pressure in the location of the inlet 1 and outlet 2 can be significantly reduced when the distance $D_1$ is kept sufficiently small such that $D_1<W2/2$. In addition, or alternatively the above effect can be reduced when the flow rate through the inlet 1 and outlet 2 ($Q_2$) is much smaller than the flow rate through the first chamber ($Q_1$), for instance $Q_1 \geq 5$ $Q_2$, advantageously $Q_1 \geq 10\ Q_2$.

In general, for accurately measuring particle concentrations it is advantageous when the first chamber is configured for preventing the sample air stream or a part thereof flowing out of the second outlet into the first chamber from entering the second inlet. Thus, on the one hand the distance $D_1$ is advantageously as small as possible to minimize pressure differences between the inlet and outlet of the second chamber, while on the other hand the distance $D_1$ is advantageously sufficiently large to prevent the recirculation of air entering the first chamber from the inlet and re-exiting through the outlet, which may induce erroneous measurements. Preferably, $D_1 \geq W_1$ because this provides sufficient time for outflowing particles to move away before having the possibility to re-enter.

Alternatively or additionally, in order to prevent recirculation in situations where distance $D_1$ is small, a physical barrier, such as a baffle, is placed between the inlet 1 and outlet 2 (not shown). The baffle projects from the wall 301 where the inlet 1 and outlet 2 are arranged, into the first chamber 3. Such a barrier does not have to extend to the wall of the first chamber opposite to wall 301. The baffle can be placed along the symmetry plane S and have mirror symmetry with respect to S. When the air flow through the first chamber is laminar, the air flow velocities will be the same on both sides of the barrier. Consequently, there will be no pressure difference due to differences in air flow velocity.

Advantageously, the outlet 2 is advantageously placed so that the flow direction through the outlet 2 is vertically upward, i.e. the wall 301 advantageously forms a top wall of the first chamber 3, i.e. gravity acts in a direction from the top wall 301 towards the interior of the first chamber 3. The view of FIGS. 3A and 3B therefore can be considered as being upside down. This ensures foreign objects like crumbled leaves, insects etc. are not likely to enter the sensor chamber 13 due to their inertia, which effect can further be enhanced by the relatively small flow rate through the outlet 2 compared to the (main) flow rate of the first chamber (typically, a ⅒ or less of the main flow rate).

It is possible to arrange multiple air samplers 20 in parallel, each communicating to a corresponding sensor chamber 13. With such an arrangement particle concentration can be measured simultaneously in multiple air streams.

Figure 4:
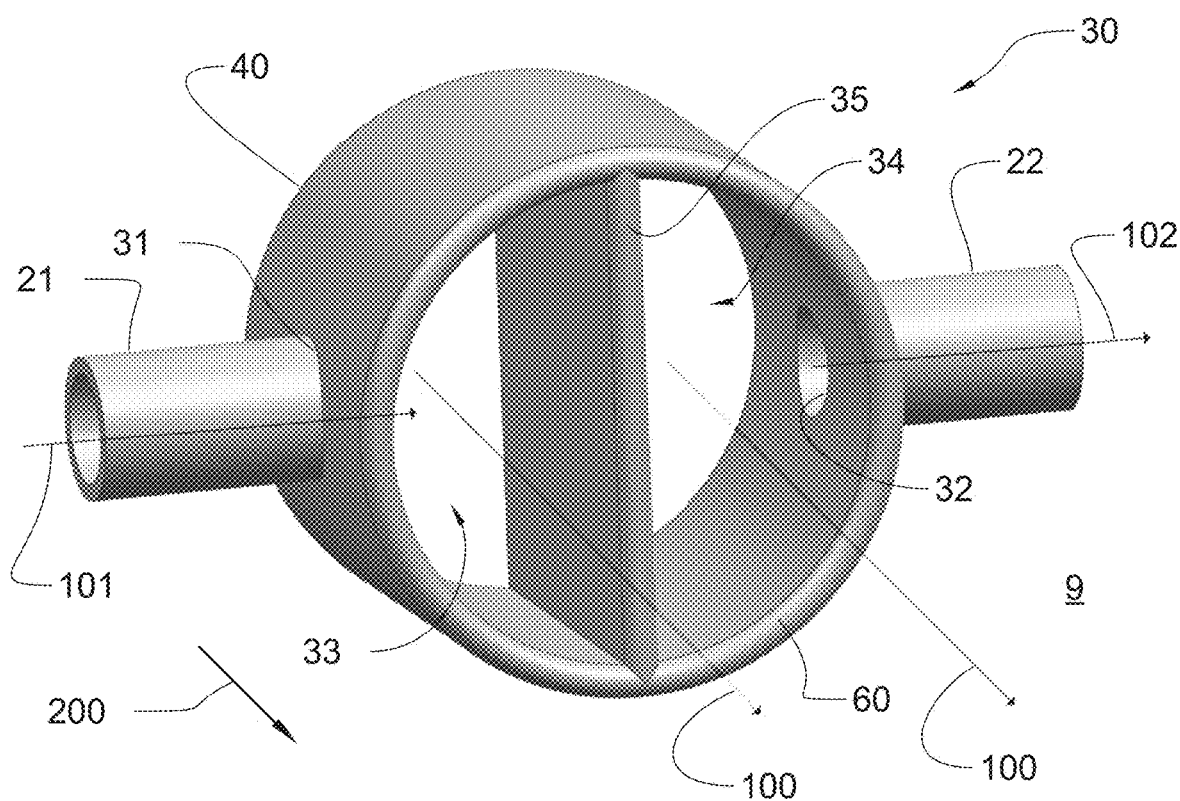
FIG. 4 represents a perspective view of another air sampler device of the present disclosure formed as a sample nozzle.
Figure 5:
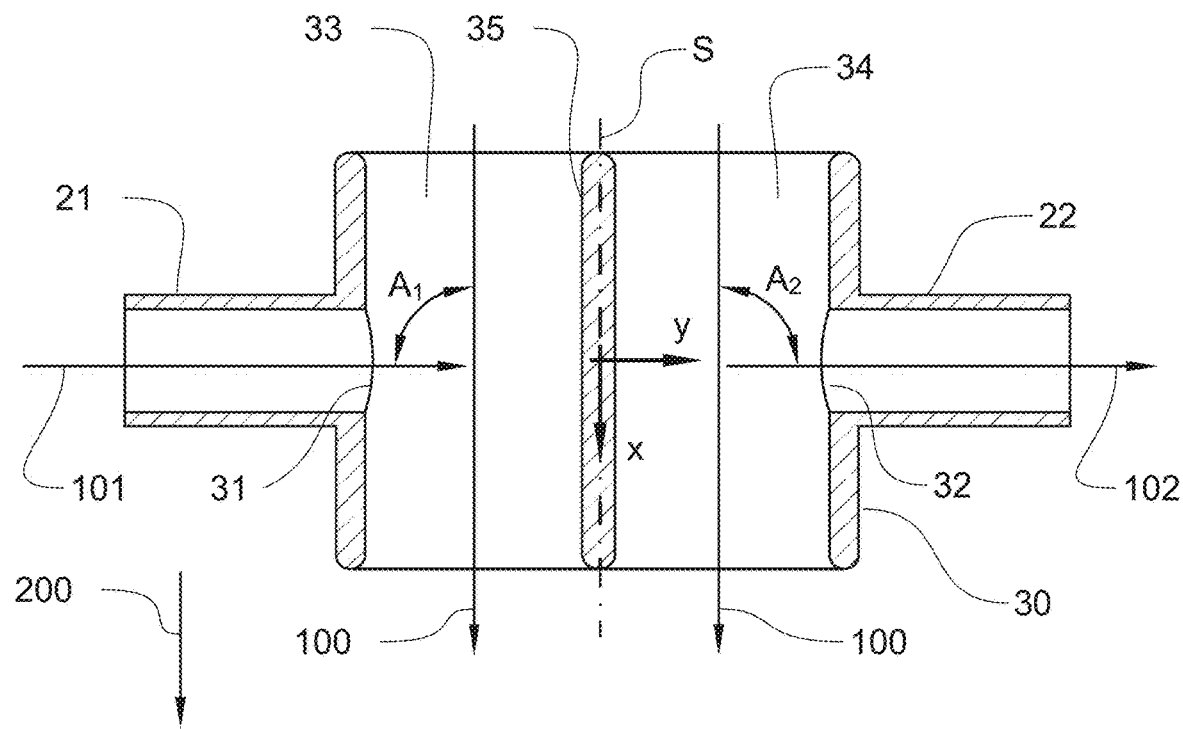
FIG. 5 represents the top view of a cut-through of the sample nozzle of FIG. 4 indicating possible angles between the inlet/outlet and the main flow in the x-y plane.
Figure 6:
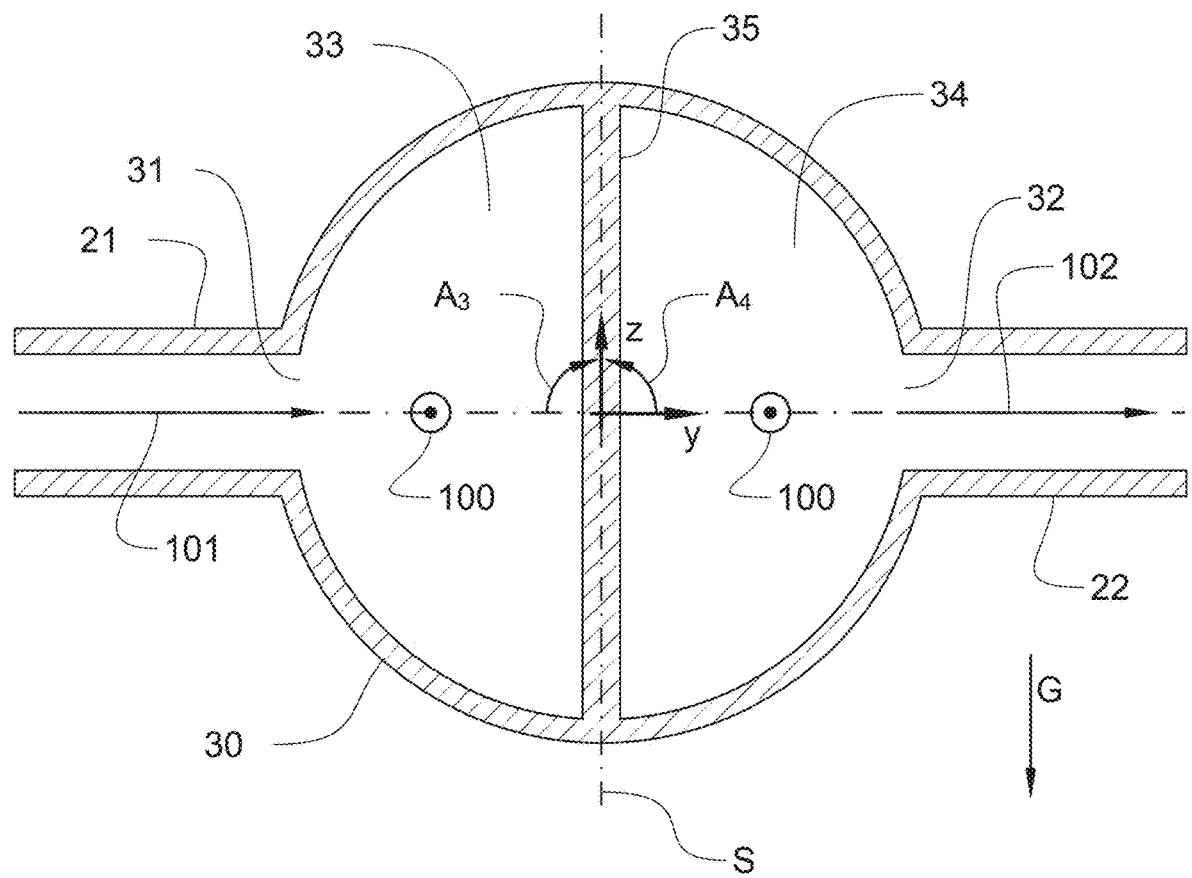
FIG. 6 represents the front view with indication of possible angles between the inlet/outlet and the main flow in the y-z plane of the sample nozzle of FIG. 4.

Referring to FIGS. 4-6, a sample nozzle 30 according to the present disclosure acts as an air sampler. Sample nozzle 30 is placed in an air stream 9, such as the inlet duct of a vehicle ventilation system. The sample nozzle 30 can be cylindrically shaped, although other shapes are possible as well. The sample nozzle 30 comprises an inlet side 40 arranged at an upstream end of the sample nozzle 30 and an outlet side 60 arranged at a downstream end of the sample nozzle, advantageously opposite the inlet side 40. The flow through the sample nozzle 30 proceeds along main flow direction 100, from the inlet side 40 to the outlet side 60, advantageously aligned along, or parallel to a direction 200 of the air stream 9. The main flow direction 100 is advantageously parallel to an axis of the sample nozzle 30, e.g. a cylinder axis.

Inlet duct 21 and outlet duct 22 have first ends that are connected to the sample nozzle 30, between inlet side 40 and outlet side 60. Inlet duct 21 and outlet duct 22 have second ends opposite the first ends that are fluidly connected to a sensor chamber (e.g. sensor chamber 13 in FIG. 1). The first ends of inlet duct 21 and outlet duct 22 are arranged in the wall of the sample nozzle 30 and respectively form the inlet 31 and outlet 32. The inlet 31 and outlet 32 are advantageously arranged at opposite wall portions of the sample nozzle, at a same or overlapping position along the main flow direction 100 through the sample nozzle 30.

A baffle 35 is arranged in the sample nozzle 30, splitting it into a first half 33 and second half 34. The inlet 31 is arranged in a wall portion of the first half 33 of sample nozzle 30, whereas the outlet 32 is arranged in a wall portion of the second half 34 of sample nozzle 30. Baffle 35 therefore forms a physical barrier separating the inlet 31 and the outlet 32. The baffle 35 advantageously extends from a position upstream the location of inlet 31 and outlet 32, e.g. from inlet side 40, to a position downstream the location of inlet 31 and outlet 32, e.g. to the outlet side 60, when considered along the main flow direction 100. Baffle 35 advantageously has a median plane advantageously extending parallel to a major face or wall of the baffle, which forms a plane of symmetry S of baffle 35. This plane of symmetry S advantageously is a plane of symmetry of the entire sample nozzle 30, and inlet 31 and outlet 32 are advantageously arranged symmetrically with respect to the plane of symmetry S.

Due to the baffle 35, the flow entering sample nozzle 30 is split, e.g. at the inlet side 40, in two parts. A first part flows through the first half 33 in which the inlet 31 is arranged. A second part flows through the second half 34 in which the outlet 32 is arranged. A portion of the second part of the flow enters the outlet 32, flows through the outlet duct 22 to the sensor chamber. The first part receives the flow that exits the sensor chamber through the inlet duct 21. Advantageously, the flow path forms a closed loop from the outlet 32 to the inlet 31 through the sensor chamber. With such a configuration, it is ensured that there is almost no pressure difference between the inlet 31 and the outlet 32 (in particular when a fan 16 in the sensor chamber 13 is not operating).

Sample air flowing from the sample nozzle 30 through the first outlet 32 defines an outlet direction 102 and sample air flowing through inlet 31 back into the sample nozzle 30 defines an inlet direction 101. Advantageously, the inlet 31 and the outlet 32 are arranged symmetrically with respect to the plane of symmetry S of sample nozzle 30. Additionally, the directions 101 and 102 may advantageously be arranged symmetrical with respect to the plane of symmetry S.

Figure 3B:
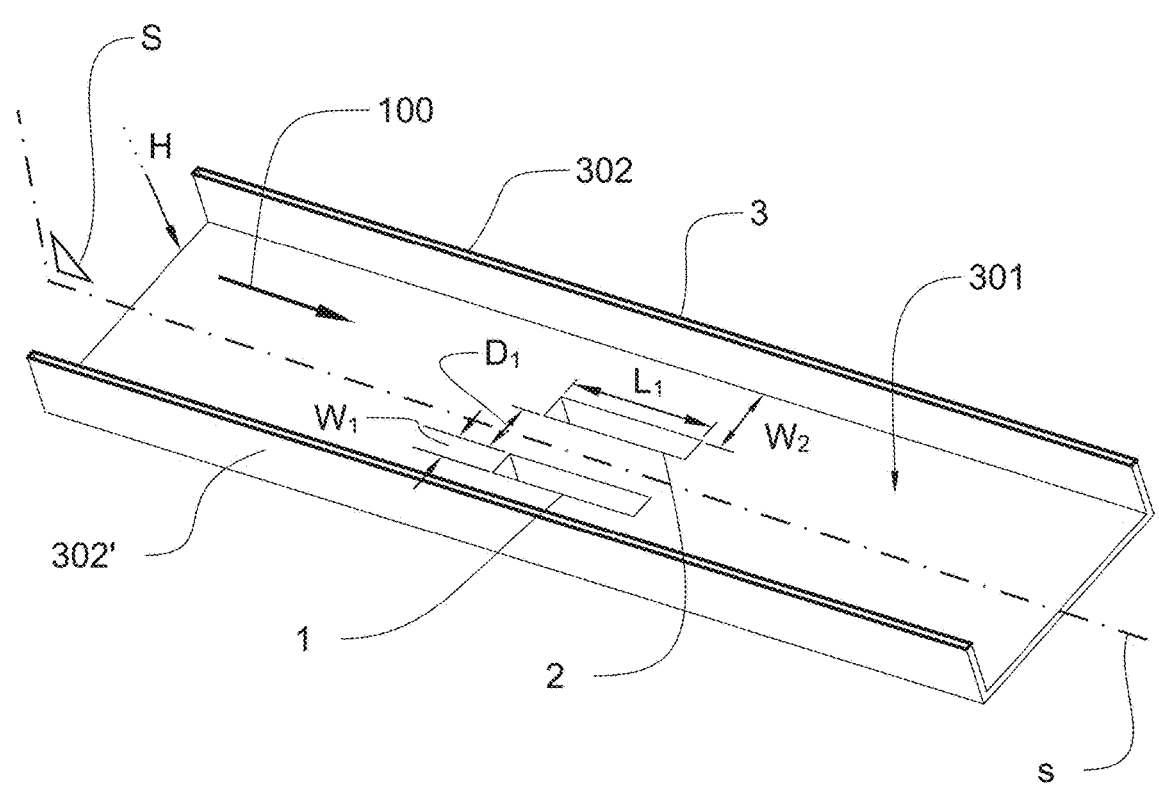

Similar considerations apply to the air flow in the sample nozzle 30 as described in relation to FIGS. 2-3B above. By way of example, the flow regime in the sample nozzle is advantageously laminar.

Referring to FIGS. 4 and 5, the outlet direction 102 of sample air flowing through the outlet 32 and the inlet direction 101 of sample air flowing through the inlet 31 back into the sample nozzle are advantageously transverse to, and advantageously substantially perpendicular to the main flow direction 100 through the sample nozzle 30. The angle A1 of inlet direction 101 and angle A2 of outlet direction 102 with respect to the main flow direction 100 is advantageously between 60° and 120°, advantageously between 75° and 105°, and advantageously substantially 90°. Preferably, the angles A1 and A2 are essentially the same. A significant deviation from this may lead to a pressure difference between the inlet 31 and the outlet 32. In the above a convention is used, in which the angle is determined starting from the upstream side of flow direction 100.

A flow velocity through the inlet 1 and/or the outlet 2 is typically 0.5-1 m/s for a channel diameter of 12-8 mm. The flow velocity through the inlet 31 and/or the outlet 32 is typically much smaller than the flow velocity through the first chamber (sample nozzle 30).

The angles A1 and A2 are advantageously equal (in absolute value) to avoid a significant pressure difference between inlet 31 and outlet 32 in situations where for instance the flow velocity through the second chamber (e.g. into the inlet 31 and exiting the outlet 32) is much smaller than the flow velocity through the first chamber (e.g. the first and second nozzle half 33, 34 of sample nozzle 30). Typically, the flow velocity through the sample nozzle can show a large variation, e.g. when placed in communication with an HVAC system, which may induce flow velocities through the first chamber that are in the order of 11 m/s and may go up to 20 m/s.

The angles A1 and A2 may however be different, for instance to compensate for a pressure difference induced by the flow through the sample ducts. Additionally or alternatively, the angle A1 can be different from 90° to influence particle sampling behavior at the inlet 31. For such embodiments it may be advantageous to have a relatively stable flow rate through the sample nozzle.

Referring to FIG. 6, the angles A3 and A4 between respectively the inlet direction 101 and the outlet direction 102 with respect to the plane of symmetry S are advantageously equal (in absolute value) and can be between 20° and 160°, advantageously between 40° and 140°, advantageously between 60° and 120°, advantageously between 75° and 105°, advantageously 90°. Angles A3 and A4 can be 90° or less, e.g. between 20° and 90°, advantageously between 45° and 90°. It will be convenient to note that the inlet 31 and outlet 32 are advantageously arranged in a top half of the first half 33 and second half 34 respectively to avoid that debris that is entrained with the air stream 9 could fall in the inlet 31 or outlet 32 by gravity which is indicated in FIG. 6 by the arrow G.

Advantageous features and considerations (e.g. baffle 35, location of inlet 31, location of outlet 32, inlet direction 101, outlet direction 102, angles A1-A4) for embodiments described above in relation to sample nozzle 30 of FIG. 4-6 similarly apply to air sampler 20 shown in FIGS. 1-3B.

The sampler device is advantageously designed such that the (mean) flow velocity into the inlet 1 or 31 and exiting the outlet 2 or 32 is significantly smaller than the (mean) flow velocity through the first chamber (or sample nozzle). Advantageously a ratio of mean flow velocity through inlet 31 or outlet 32 to the mean flow velocity through the first chamber 3 or sample nozzle 30 is ½ or less, advantageously between ⅓ and ¹⁄₅₀, advantageously between ¼ and ¹⁄₂₀, advantageously about ¹⁄₁₀.

In an advantageous embodiment of the sampler device according to the present disclosure, the first chamber 3 of FIGS. 1-2 and the sample nozzle 30 of FIG. 4 are cascaded. In particular, the sample nozzle 30 is placed upstream of the first chamber 3, e.g. in an air stream 9, e.g. the ventilation duct of a vehicle or a building, and the inlet 31 and outlet 32 of the sample nozzle 30 are fluidly connected to the outlet 12 and the inlet 11 respectively of the first chamber 3. The sensor chamber 13 can be connected to the inlet 1 and the outlet 2 of the first chamber 3 as shown in FIG. 1. By so doing an arrangement is obtained with three cascaded chambers, i.e. the sample nozzle 30, the first chamber 3 and the sensor chamber 13. Such an arrangement advantageously allows for further stabilizing the sample air flow through the sensor chamber irrespective of dynamic pressure variations of air stream 9. Such an arrangement also allows for a stepwise reduction in flow rates. For instance, the flow rate through sample nozzle 30 may be about 100 lpm, while the flow rate through first chamber 3 is about 3 lpm and the flow rate through the sensor chamber is about 0.3 lpm.

Figure 7:
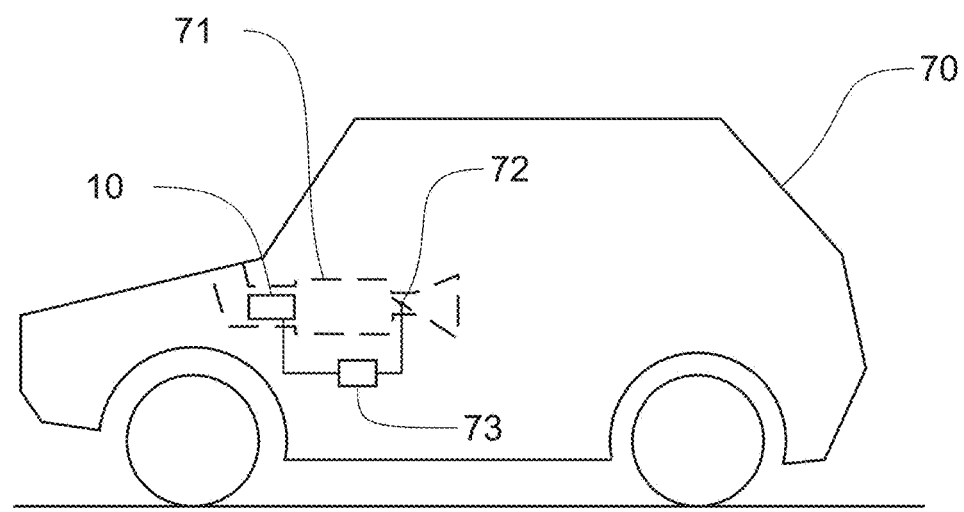
FIG. 7 represents a vehicle comprising a device for sensing particle concentration according to the present disclosure.

Sampler devices and devices for sensing particle concentration according to the present disclosure are advantageously used in the ventilation system of vehicles. Referring to FIG. 7, a vehicle 70 can comprise the device 10 for sensing particle concentration. Device 10 can be arranged in a duct, e.g. the inlet duct of a vehicle ventilation system 71 providing air to a driver and/or passenger compartment. The ventilation system may comprise electrically operated valves 72 which are operably coupled to device 10, e.g. via a controller 73. When a too high particle concentration is sensed by device 10, the controller 73 may be configured to close the valves 72 reducing or blocking a flow of air from the external environment to the driver or passenger compartment.

The invention claimed is:
1. A sampler device for sampling gas for a particle concentration sensor from a flow, the sampler device comprising:
 a first chamber comprising a first inlet and a first outlet and defining a main flow direction of a gas stream between the first inlet and the first outlet, the first chamber comprising a wall including a second inlet and a second outlet, wherein the second inlet and the second outlet are spaced apart along the wall;
 wherein the second inlet and the second outlet are configured to provide a sink and a source of a sample gas stream, respectively;
 a second chamber fluidly coupled to the second inlet and to the second outlet, such that the sample gas stream is configured to flow from the second outlet to the second inlet through the second chamber; and a baffle arranged in the first chamber between the second inlet and the second outlet, wherein the baffle projects from the wall into the first chamber;

wherein the second inlet and the second outlet are disposed in the first chamber at a first position and a second position respectively; and wherein the first position and the second position overlap along the main flow direction.

2. The sampler device of claim 1, further comprising a fan configured to cause the sample gas stream to flow from the second outlet to the second inlet through the second chamber.

3. The sampler device according to claim 1, wherein the first chamber comprises a plane of symmetry (S) parallel to the main flow direction, and wherein the second inlet and the second outlet are arranged at opposite sides of the plane of symmetry.

4. The sampler device according to claim 3, wherein the baffle extends parallel to the plane of symmetry (S), wherein the plane of symmetry is a plane of symmetry of the baffle.

5. The sampler device according to claim 3, wherein the second inlet comprises an inlet duct adjacent the first chamber and in fluid communication with the first chamber and the second outlet comprises an outlet duct adjacent the first chamber and in fluid communication with the first chamber, and wherein the inlet duct is disposed on an opposite side and mirrors the outlet duct with respect to the plane of symmetry (S).

6. The sampler device according to claim 1, further comprising:
a third chamber comprising a third inlet arranged downstream from and in fluid communication with the second outlet and a third outlet arranged upstream from and in fluid communication with the second inlet, wherein the third inlet and the third outlet define a second main flow direction between the third inlet and the third outlet, wherein the third chamber comprises a wall including a fourth outlet and a fourth inlet;

wherein the fourth inlet and the fourth outlet are disposed in the third chamber at a third position and a fourth position respectively, wherein the third position and the fourth position overlap along the second main flow direction;

wherein the second chamber is fluidly connected to the second inlet via the fourth inlet and wherein the second chamber is fluidly connected to the second outlet via the fourth outlet.

7. The sampler device according to claim 1, wherein the second inlet and the second outlet are arranged next to one another when regarded in a plane perpendicular to the main flow direction.

8. The sampler device according to claim 1, wherein a pressure in the first chamber at the first and second position is substantially equal.

9. The sampler device according to claim 1, wherein the second inlet comprises an inlet duct adjacent the first chamber and in fluid communication with the first chamber and the second outlet comprises an outlet duct adjacent the first chamber and in fluid communication with the first chamber, wherein a longitudinal axis of the inlet duct and a longitudinal axis of the outlet duct are substantially perpendicular to the main flow direction.

10. The sampler device according to claim 1, wherein the baffle extends between opposing walls of the first chamber.

11. The sampler device according to claim 1, wherein the sample gas stream comprises air.

12. A device for sensing particle concentration in a gas, the device comprising:
the sampler device of claim 1; and
a particle concentration sensor disposed in the second chamber.

13. An assembly for sensing particle concentration in air, the assembly comprising:
two devices according to claim 12, wherein the gas is air, wherein the two devices are configured to sample air from different environments.

14. The assembly of claim 13, further comprising an enclosed space, wherein one of the two devices is configured to sample air inside the space and the other one of the two devices is configured to sample air outside the space.

15. A ventilation system, comprising a sampler device according to claim 1, wherein the gas is air.

16. The ventilation system according to claim 15, further comprising a particle concentration sensor disposed in the second chamber.

17. A ventilation system, comprising two of the sampler devices in accordance with claim 1, wherein each of the two sampler devices further comprises a respective particle concentration sensor disposed in the second chamber;
wherein a first of the two sampler devices is configured to sample air from a first environment, and a second of the two sampler devices is configured to sample air from a second environment different from the first environment.

18. A vehicle comprising the ventilation system according to claim 17, wherein the first environment is air inside the vehicle and the second environment is air outside the vehicle.

19. A method for sampling gas, the method comprising providing the sampler device according to claim 1 in a flow of gas to be sampled and wherein the flow of gas is laminar at the first and the second position.

20. The method according to claim 19, wherein a Reynolds number for the flow of gas is 1500 or less at the first position and the second position.

* * * * *